United States Patent [19]

Bacher et al.

[11] Patent Number: 4,531,622
[45] Date of Patent: Jul. 30, 1985

[54] CLUTCH MECHANISM FOR AUTOMOBILE VEHICLES

[75] Inventors: Michel Bacher, Garges-les-Gonesse; Dominique Despres, Clichy, both of France

[73] Assignee: Valeo, Paris, France

[21] Appl. No.: 389,768

[22] Filed: Jun. 18, 1982

[30] Foreign Application Priority Data

Jun. 19, 1981 [FR] France ................................ 81 12094

[51] Int. Cl.³ .............................................. F16D 13/70
[52] U.S. Cl. ................................ 192/70.18; 192/70.28; 192/109 R
[58] Field of Search ............... 192/70.18, 70.28, 89 B, 192/109 R

[56] References Cited

U.S. PATENT DOCUMENTS

| 2,770,341 | 11/1956 | Wobrock | 192/89 B X |
| 3,130,828 | 4/1964 | Maurice | 192/89 B X |
| 3,450,241 | 6/1969 | Kuno | 192/70.18 |
| 3,489,256 | 1/1970 | Binder et al. | 192/70.18 X |
| 3,712,435 | 1/1973 | Kraus | 192/89 B X |
| 4,122,929 | 10/1978 | Maucher et al. | 192/70.18 |
| 4,362,230 | 12/1982 | Corral | 192/70.28 X |

FOREIGN PATENT DOCUMENTS

| 2906863 | 9/1980 | Fed. Rep. of Germany . |
| 1580169 | 7/1969 | France . |
| 2342427 | 9/1977 | France . |

Primary Examiner—Rodney H. Bonck
Attorney, Agent, or Firm—Charles A. Brown; Charles E. Brown

[57] ABSTRACT

A clutch mechanism, particularly for a motor vehicle, is fitted with stop means to check the axial travel of the pressure plate after a predetermined distance of axial travel thereof with respect to the cover. The stop means include at least one radial lug which, independently of the cover, is fixed thereto using fixing means connecting to the cover the leaf-springs which provide the rotational connection between the pressure plate and the cover. The lug or lugs act on the outer circumferential edge of the pressure plate.

10 Claims, 9 Drawing Figures

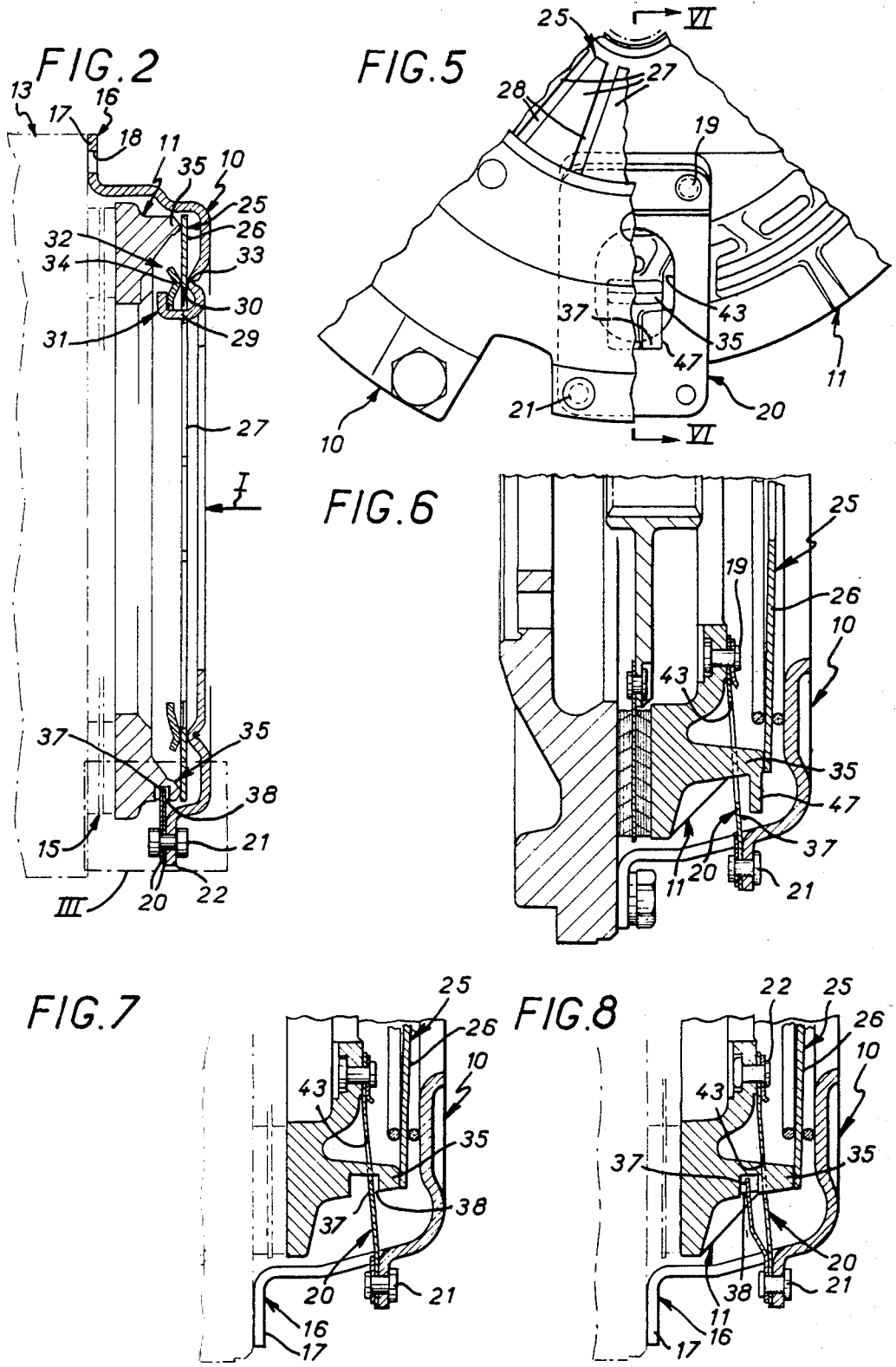

CLUTCH MECHANISM FOR AUTOMOBILE VEHICLES

BACKGROUND OF THE INVENTION

The present invention relates in general terms to clutches, particularly for motor vehicles, and relates more in particular to the part of these clutches, commonly referred to as the clutch mechanism, which, itself constituting a unit assembly, is, in this form, designed to be fitted onto a plate, known as the reaction plate, after the insertion of a clutch plate in order to constitute such a clutch.

Stated in general terms, such a clutch mechanism includes a first generally annular part, known as the cover; a second generally annular part known as the pressure plate, which is connected for rotation with the cover by linking means which allow it to be displaced axially with respect to the latter; and axially acting resilient means, which, by bearing against the cover, act axially on the pressure plate in a direction tending to urge said pressure plate away from said cover.

The present invention particularly concerns the case where the linking means which link the pressure plate to the cover so that they rotate together are made up by elastically deformable leaf-springs which, individually or in sets, are fixed to the cover at one of their ends and at the other end are fixed to the pressure plate.

Such leaf-springs may, for example, extend substantially tangentially to a circumference of the clutch assembly.

Alternatively, they may extend substantially radially with respect to the axis of the clutch assembly.

Concerning the resilient means acting in the axial sense which operates between the pressure plate and the cover, these may, for example, be constituted by a peripheral portion, forming a Belleville or cup-shaped spring washer of a third annual part known as the diaphragm, the central portion of which is split up into radial fingers for the control and release of its said peripheral portion.

Generally speaking, it is desirable in clutch mechanisms of this type to be able to limit the axial travel which the pressure plate is able to undergo when acted on by the resilient means acting in the axial sense, which exert a force thereon.

This is the case, notably, during the time when such a clutch mechanism is being stored, prior to its assembly onto a reaction plate, since, if the pressure plate which is then not provided with countersupport by such a reaction plate via a clutch plate, were not then to have limited axial clearance with respect to the cover, this could result in deterioration of the linking means connecting it to the cover, particularly when these involve, as mentioned above, simple leaf-springs only exhibiting moderate strength in the axial sense.

This is the reason why the usual practice is to associate stop means with the pressure plates which are adapted to retain it in the axial sense after a determined length of axial travel with respect to the cover.

Such an arrangement, which has been known for some considerable time, is notably described in the French Patent filed under No. 77 05555 on Feb. 25, 1977 and published under U.S. Pat. No. 2,342,427.

In this French Patent, the stop means employed are made up by circumferential extensions of the leaf-springs which connect the pressure plate for rotation with the cover, and which, in practice, comprise in this case leaf-springs arranged substantially tangentially to a circumference of the assembly.

However, if such a design provides the advantage of allowing these stop means to be fixed to the cover using the same fixing means already used to attach the leaf-springs thereto, it makes it necessary, firstly, to fix these leaf-springs to the cover then onto the pressure plate, in order to assemble this clutch assembly, which complicates the latter.

Moreover, it makes it necessary to provide, in order to carry out such fixing, large passages in the peripheral edge of the cover, which has a detrimental effect on the rigidity of the latter.

Moreover, it is only really suitable in mechanisms designed to be attached onto a relatively flat reaction plate, and, consequently, only to mechanisms in which the cover is hollow, and not, inversely, to mechanisms in which said cover is relatively flat.

Moreover, it renders reconditioning and repair after first use of the mechanisms concerned difficult to carry out or even impossible, such reconditioning involving the cover as well and no longer just the pressure plate itself.

Finally, it can in practice only be applied to mechanisms in which the leaf-springs connecting, in rotation, the pressure plate to the cover can only be mounted in one sense.

Stated in other terms, a clutch assembly which is thus equipped is only able to operate correctly in one sense of rotation only, which, in an expensive fashion, makes it necessary to provide clutch mechanisms which are adapted to operate in one direction of rotation and in the other, and to carry out separate manufacturing runs.

In West German Patent application filed on Feb. 22, 1979 under No. P 29 06 863, one particular embodiment provides stop means which make use of arms which, independently of the cover, extend radially in order to cooperate with a transverse shoulder on the pressure plate.

However, in this West German Patent application, firstly, the arms thus used are fixed to the cover by means other than those used to attach thereto the leaf-springs providing the connection, in rotation, of the pressure plate to said cover, which complicates the practical embodiment of the assembly, and, secondly, they project at the internal periphery of said pressure plate thus decreasing the amount of space available in the axial sense for the clutch plate.

Moreover, these arms act on the side of the pressure plate corresponding to the periphery of smallest diameter thereof, and consequently at a relatively remote region, in the radial sense, from that at which the diaphragm moreover acts, which is not favourable to their effectiveness nor to their operating life.

In French Patent No. 1,580,169 stop means are provided which also employ at least one arm, which, independently of the cover, is fixed thereto by fixing means connecting to said cover the leaf-springs which connect the pressure plate to the cover for rotation therewith.

However, this arm cooperates with the rear face of the pressure plate, in order words with the face thereof which is most remote from the cover.

Such an arrangement, which has been designed for use in a clutch mechanism with a relatively flat cover is not suitable for use in all types of clutch mechanisms, and notably in those having a hollow cover.

Moreover, as it acts in the axial sense, it can bring about difficulties in respect of the axial sides of the assembly.

Finally, the Z-shaped configuration which practice requires the arm(s) employed to possess, may be somewhat difficult to achieve.

The present invention, stated in general terms, has as its object an arrangement which provides, in an advantageous fashion, a compromise between the previous arrangements, whilst at the same time avoiding the disadvantages of these, and which is advantageously adapted to all types of clutch mechanisms.

SUMMARY OF THE INVENTION

The invention provides a clutch mechanism, particularly for motor vehicles, of the type including a first generally annular part, known as the cover; a second generally annular part, known as the pressure plate, which is connected in rotation to the cover by resiliently deformable leaf-springs allowing axial displacement of said pressure plate with respect to said cover, said leaf-springs being fixed individually or in sets, to the cover at one of their ends and at the other of their ends to the pressure plate; resilient means acting in the axial sense, which resilient means are supported against said cover, operate in the axial sense on the pressure plate tending to urge the pressure plate in a direction away from said cover; and stop means which are adapted to check the axial travel of the pressure plate after a predetermined distance of axial travel of the latter with respect to the cover, said stop means including at least one lug, which, independently of the cover, is fixed to the latter by fixing means attaching said leaf-springs to said cover, said at least one lug being adapted to act on the outer peripheral edge of the pressure plate, at the side thereof corresponding to its outer diameter.

The term "edge" of the pressure plate should in its broadest terms be considered to mean all that portion of the pressure plate axially located between the two transverse faces of this pressure plate, in other words between, firstly, the face of this pressure plate by means of which it acts on the clutch plate and, secondly, the face of this pressure plate on which the diaphragm acts.

Thus, in accordance with the invention, the fixing means connecting the lugs forming the stop means to the cover are advantageously the same as those which connect to this cover the leaf-springs providing the connection in rotation of the pressure plate to said cover, which simplifies the practical arrangement of the assembly.

Moreover, and conjointly with this, the lugs forming said stop means act at the outer peripheral edge of the pressure plate, and consequently as close as possible to the region of the latter at which, moreover, the diaphragm acts, which has a favourable influence on their effectiveness and long service life, the axial force which they require to act as a counterstop against being developed substantially along the same circumference as their own region of action.

Finally, the cover can, with advantage, be either hollow, or relatively flat, which is suitable for all types of mechanisms, this cover not requiring modification at the time of reconditioning of such a mechanism, the weight, and consequently the inertia of the pressure plate being reduced with advantage, at least in certain embodiments, by the slots which are formed in it for cooperating with the lugs forming the associated stop means, said slots not having an effect on the cost of such a pressure plate as they can be formed at the time of casting or be machined in a relatively inexpensive fashion at the same time as other operations are being carried out, and their base is advantageously adapted to form a radial stop.

BRIEF DESCRIPTION OF THE DRAWINGS

FIG. 2 shows a view in axial section, according to the broken line II—II in FIG. 1;

FIG. 5 is a partial view similar to that in FIG. 1 and relates to a further alternative embodiment;

FIG. 6 shows a partial view in cross section of this embodiment, in accordance with line VI—VI in FIG. 5;

FIGS. 7 and 8 are partial views similar to that in FIG. 6 and each, respectively, relate to one alternative embodiment of the clutch mechanism concerned;

DESCRIPTION OF THE PREFERRED EMBODIMENTS

Figure 1:
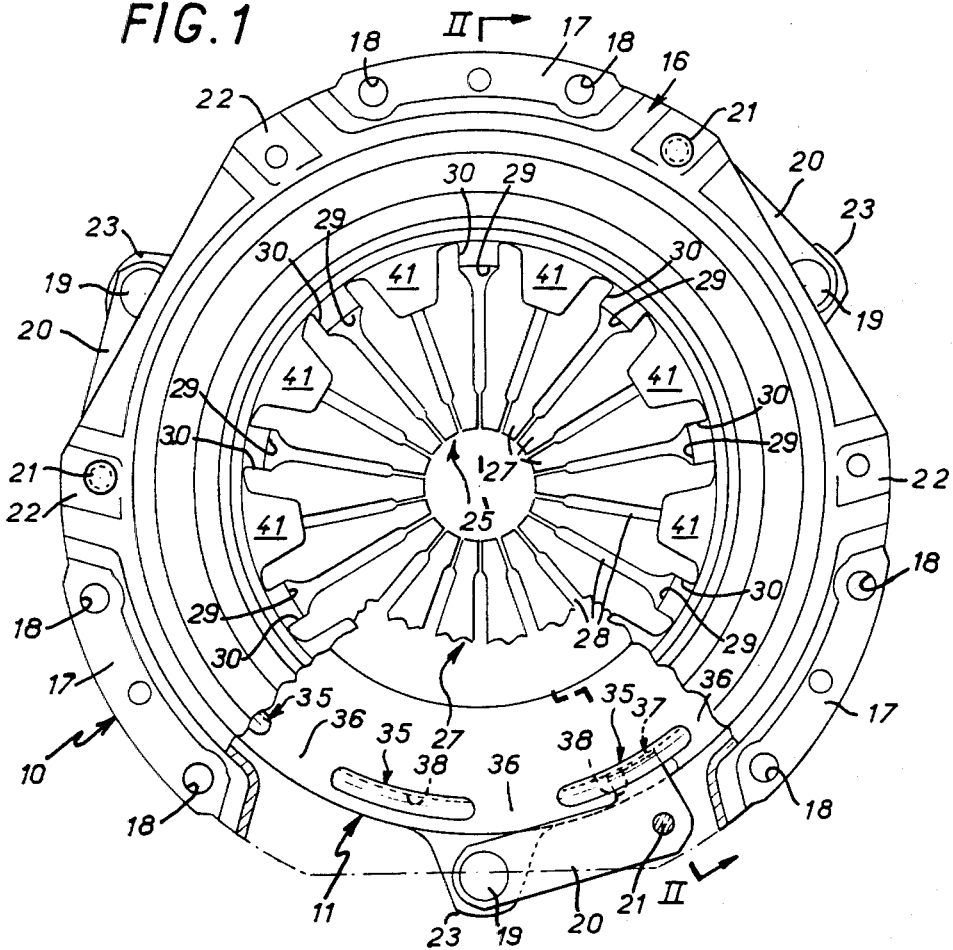
FIG. 1 shows, with local removal of the surface, an elevational view of a clutch mechanism in accordance with the invention, according to arrow I in FIG. 2.

Stated in general terms, and as illustrated in these Figures, a clutch mechanism in accordance with the invention includes, in a manner known per se, a first generally annular part 10, known as the cover, a second generally annular part 11, known as the pressure plate, and, inserted between these, resilient means acting in the axial sense, which will be described in detail below and which, being supported by the cover 10, act in the axial sense on the pressure plate 11 in a sense for which said pressure plate 11 moves away from said cover 10.

As shown diagrammatically in dashed lines in FIG. 2, this clutch mechanism is designed to be attached, using for example screws which are not shown, onto a reaction plate 13, or flywheel, rigidly fixed in rotation to a first shaft, in practice a driving shaft which also is not shown, after insertion of a clutch plate 15, which is rigid in rotation with a second shaft, in practice a driven shaft, which also has not been shown.

In order to fit it to the reaction plate 13, the cover 10 has, at its periphery of outer diameter, or outer periphery, a radial flange 16, which, at certain places, forms flat areas 17 provided with holes 18 adapted to allow the passage of the screws necessary for this fixing operation.

The pressure plate 11 is connected in rotation to the cover 10 by resiliently deformable leaf-springs 20 allowing axial displacement of said pressure plate 11 with respect to said cover 10.

In the embodiments shown in FIGS. 1 to 4, these leaf-springs 20 extend tangentially to a circumference of the clutch assembly.

Figure 3:
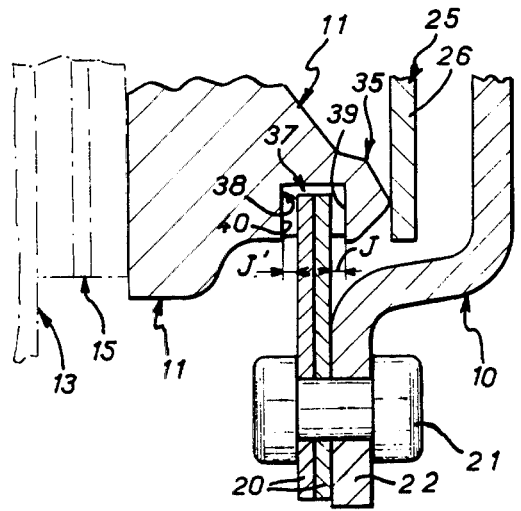
FIG. 3 shows detail, on an enlarged scale, of FIG. 2, defined by the inset III on the latter.

In the embodiment illustrated more particularly in FIGS. 1 to 3, they are associated in sets of two, and three sets of two leaf-springs 20 are thus provided which are regularly distributed in a circular pattern.

Being thus grouped in sets of two, the leaf-springs 20 are, at one of their ends, fixed to the cover 10 by a rivet 21 fitted onto a flat area 22 of the cover 10 arranged to be axially retracted with respect to the flat areas 17 thereof referred to above, and, at their other end, they are fixed to the pressure plate 11 by a rivet 19 fitted into a radial lug 23 provided for this purpose thereon and projecting at its outer periphery.

In the various embodiments shown in the Figures, the resilient means acting in the axial sense interposed between the cover 10 and the pressure plate 11 comprise a third annular part 25, known as the diaphragm, which has a peripheral portion 26 forming a Belleville or cup-shaped washer and a central portion which is split up into radial fingers 27 by slits 28.

Using linking means which connect it up to the cover 10, this diaphragm 25 is mounted in a pivoting fashion on the latter.

In the embodiment illustrated in FIGS. 1 to 3, the corresponding linking means comprise, firstly, support tabs 29, which leave the cover 10 at the internal periphery thereof, or in the region of this periphery, pass axially through the diaphragm 25, making use of openings 30 provided at the root of the radial fingers 27 of the latter, and together form on the far side of the diaphragm 25, a support lip 31, and, secondly, an annular retaining ring 32, which is braced by the support tabs 29, using the support lip 31 formed by the latter.

The cover 10 provides a first support for the diaphragm 25, at a first side of the peripheral portion forming the Belleville or cup-shaped washer 26 of it, and has for this purpose, in the annular sense, a half-wave-shaped deformation 33 forming a retaining surface, and, conjointly, the annular retaining ring 32 provides a second support for the diaphragm 25, at the other side of said peripheral portion 26 thereof, and has for this purposed, in the annular sense, in line with the deformation forming the retaining surface 33 of the cover 10, an open V-shaped deformation 34 which also forms a retaining surface.

Using its peripheral portion 26 forming the Belleville or cup-shaped washer, the diaphragm 25 bears on the pressure plate 11 using axial bosses 35 which the latter exhibits, these being arranged annularly and projecting at certain positions in the embodiment shown so as to alternate with intervals 36; alternatively, an axial boss which is circularly continuous, and no longer split up in the annular sense, can be employed.

Whatever the case may be, the diaphragm 25, thus gaining its support from the cover 10, permanently urges, using its peripheral portion 26 forming the Belleville or cup-shaped washer, the pressure plate 11 towards the reaction plate 13, in order to clamp the clutch plate 15.

By acting on the radial fingers 27 of the diaphragm 25, the clutch plate 15 can be un-clamped when declutching.

These arrangements are already well known and, as they do not constitute part of the present invention, they will not be described in greater detail here.

In a manner also known per se, stop means are provided which are adapted to check the axial travel of the pressure plate 11 after a predetermined distance of axial travel thereof with respect to the cover 10, said stop means including at least one lug 37, which, independently of the cover 10, is fixed to the latter by fixing means which attach to said cover 10, the leaf-springs 20 which connect the pressure plate 11 in rotation to this cover 10.

In accordance with the invention, said lug 37 acts on the edge, as defined hereinbefore, of the pressure plate 11, at the side thereof corresponding to its periphery of the outer diameter.

In the embodiment illustrated in FIGS. 1 to 3, three lugs 37 are provided, which extend radially and which, in practice, each form a radial extension of the leaf-springs 20, as can best be seen in FIG. 1.

In this embodiment, the lugs 37 consequently constitute an integral part of the leaf-springs 20.

Moreover, in this embodiment, each one of the lugs 37 is engaged in a slot 38 in the pressure plate 11, which is radially open towards the outside, at that side of the edge of the pressure plate corresponding to the periphery of the outer diameter, and which is limited transversely by a shoulder 39, at least on the side of the slot adjacent the transverse face of the pressure plate 11 facing the cover 10.

Finally, in this embodiment, such a slot 38 is formed on the edge of the pressure plate 11, and, more precisely, on the corresponding axial boss 35 thereof; it extends circumferentially and is limited transversely, at the side of the pressure plate 11 directed away from the cover 10, by a shoulder 40, which is parallel to the above-stated shoulder 39, and opens out circumferentially in the intervals 36 between corresponding axial bosses 35.

Such a slot can advantageously be provided using turning; each one of the axial bosses 35 is then involved.

It can also be provided during the casting operation.

Originally, when the clutch linings of the clutch plate 15 are new, an axial clearance J is provided between the lugs 37 and the shoulder 39 of the slots 38 in which the lugs are engaged, this axial clearance J defining the axial length of travel allowed for the pressure plate 11 with respect to the cover 10.

Along with this, on the other side of the radial lugs 37, between the latter and the shoulder 40 of the slot 38 of the pressure plate 11 in which the lugs are engaged, an axial clearance J' is also provided, which is appropriate to the withdrawal movement of the pressure plate 11, or the extent of rasing, necessary to disengage the clutch plate 15 when declutching, and allowing the leaf-springs 20 to be fitted onto the pressure plate 11 when the latter are substantially plane.

Clearly, and as has been shown, the cover 10 may exhibit tongues 41 between the tabs 29, these being arranged radially and at its internal periphery and being adapted, in a manner known per se, to provide support for the diaphragm 25 prior to fitting the assembly onto the associated reaction plate; in such a case, when the diaphragm 25 is thus bearing against these tongues 41, a slight clearance exists between the lugs 37 and the shoulder 39 of the pressure plate 11, such lugs then only being intended to play a part if, as a result, for example, of inexpert manipulation of the assembly, said pressure plate were to have a tendency, as a result of inertia, to project outside of the cover 10, and to prevent the leaf-springs 20 from then being subject to deterioration and no longer being able to give correct and useful service.

Thus, as will be noted, the lugs 37 are adapted to bear against the associated shoulders 39 along an average circumference of diameter substantially equal to that of the circumference along which the diaphragm 25 itself bears on the pressure plate 11, which is of such a nature as to advantageously ensure alignment of the action-reaction forces to which said pressure plate may thus be subject, without any turning moment whatsoever being generated.

It will also be noted that the base of the slots 38 is designed to constitute a radial abutment surface for the lugs 37, which provides a security factor in the case where the leaf-springs 20 become broken.

It will finally be seen that the leaf-springs 20 may equally as well extend tangentially in one sense, for operation of the clutch mechanism concerned in a first direction of rotation, as well as in the other sense, for operation of this clutch mechanism in the opposite direction of rotation, the cover 10 exhibiting, in a symmetrical fashion, flat areas 22 suitable for such attachment with the leaf-springs 20 extending in one or the other of these directions.

Whatever the case may be, at the time of assembly, the leaf-springs 20 are firstly fixed to the pressure plate 11, the radial lugs 37 which they constitute then being engaged in the corresponding slots 38, after which they are fixed to the cover 10.

Alternatively, as the interval 36 between axial bosses 35 is larger, in the circular sense, than these bosses, assembly of the bayonet type is possible, the lugs 37 being firstly engaged axially between the axial bosses 35 prior to coming into engagement, which results from a rotational movement about the axis of the assembly, with the slots 38 of the bosses.

In this case, the leaf-springs 20 are first fixed to the cover 10.

Figure 4:
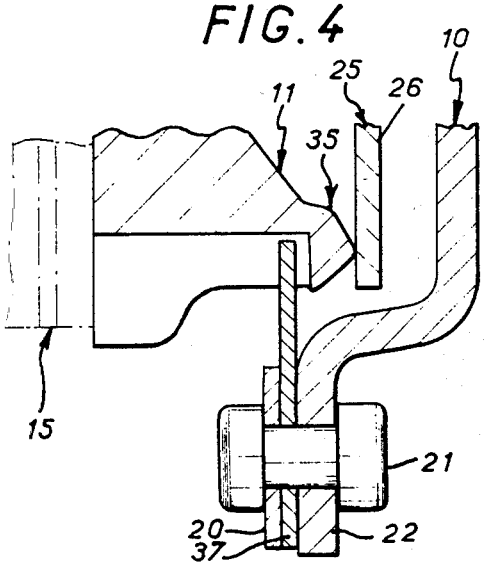
FIG. 4 is a similar view to that in FIG. 3 and relates to one alternative embodiment.

In the alternative embodiment illustrated in FIG. 4, the leaf-springs 20 which connect the pressure plate 11 in rotation to the cover 10 act individually between this pressure plate and the cover 10.

Each one has associated therewith a radial lug 37, which forms a separate piece, but which is fixed to the cover 10 using the same rivet 21 which fastens the corresponding leaf-spring 20 to it.

Moreover, in this alternative embodiment, an axial groove 38' in the pressure plate 11 into which such a radial lug 37 is engaged, extends axially and is axially open at the surface of the pressure plate 11 on the side thereof directed away from the cover 10.

The axial groove 38' which is consequently formed with a slot 38 is advantageous in facilitating, at the time of assembly, the pre-positioning of the leaf-springs 20, prior to fixing the latter to the pressure plate 11.

An axial groove 38' of this type can be manufactured using a milling operation; it may also be provided during the casting operation.

In accordance with the alternative embodiment there is illustrated the provisions of the two preceding cases, each slot 38 extends circumferentially, and communicates with an axial groove 38', which may or may not be axially open at the surface of the pressure plate 11.

In the embodiments illustrated in FIGS. 5 to 8, the leaf-springs 20 linking the pressure plate 11 to the cover 10 are also employed individually between this pressure plate 11, and the cover 10, but they extend substantially radially with respect to the axis of the clutch assembly.

In practice, in these embodiments, the pressure plate 11, as was the case above, has extending therefrom in the axial sense, at various locations and for providing a support surface for the diaphragm 25, a plurality of axial bosses 35, and each leaf-spring 20, which generally takes the shape of a small rectangular plate, is, using a central opening 43 which decreases its stiffness, engaged on such an axial boss 35.

Finally, in these embodiments, two rivets 21 are provided for fixing a small plate of this type onto the cover 10, and two rivets 19 are also provided for fixing it to the pressure plate 11, this latter fixing then being done at the internal periphery of said pressure plate 11.

The radial lugs 37 provided in accordance with the invention for constituting the stop means may, as was the case above, constitute an integral part of the leaf-springs 20.

This is the case in the embodiments illustrated in FIGS. 5 to 7.

Each one of the radial lugs 37 employed is then made up by a portion bordering on the opening 43 of the corresponding leaf-spring 20, which consequently constitutes, by itself, a stop means.

In the embodiment shown in FIGS. 5 and 6, the axial boss 35 of the pressure plate 11 associated with a leaf-spring 20 includes, in order to cooperate with such a radial lug 37, a radial projection 47 which extends radially in the opposite direction to the axis of the assembly, and which consequently belongs to the edge, as defined hereinbefore, of the pressure plate 11.

By way of variation, see FIG. 7, each leaf-spring 20 is, at its border forming the associated radial lug 37, engaged in a slot 38 of the corresponding axial boss 35, which constitutes part of the edge of the pressure plate 11.

In the embodiment illustrated in FIG. 8, a radial lug 37 is associated with each leaf-spring 20 and this, constituting a part which is separate from this leaf-spring 20 is fixed to the cover 10 using the same rivet 21 as is used for the latter, and is engaged radially in a slot 38 of the corresponding axial boss 35, which constitutes part of the edge of the pressure plate 11.

Figure 9:
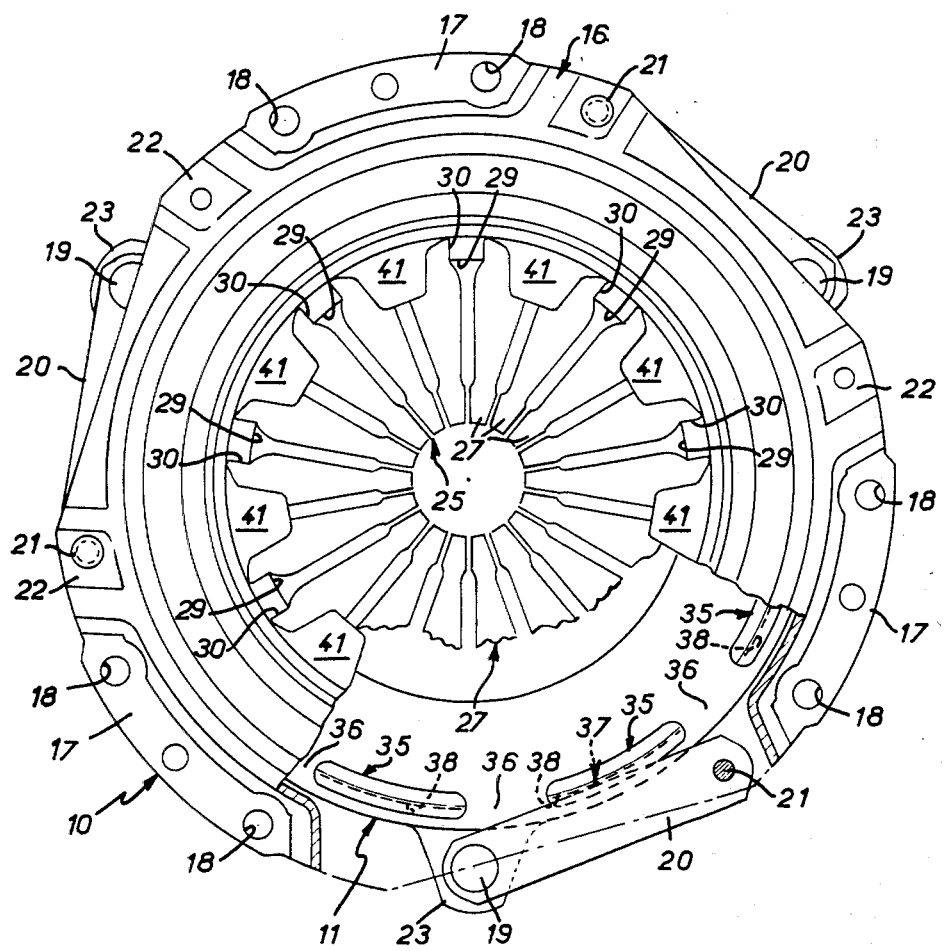
FIG. 9 partially repeats FIG. 1 and relates to a further alternative embodiment.

In the variation of embodiment illustrated in FIG. 9, the lug 37 associated with a slot 38 of an axial boss 35 is directly formed by the edge of the corresponding leaf-springs 20, which remains rectilinear, said leaf-springs simply being engaged, using said edge, in said slot 38.

Such an arrangement is, with advantage, relatively inexpensive to employ, since the configuration of the leaf-springs is then the usual one, without a radial projection, and this is advantageous in reducing the space occupied in the radial sense by the assembly.

Nevertheless, the lug 37 thus formed by the free edge of at least one leaf-spring 20 acts radially with respect to the pressure plate 11, as was the case above, so that said lug is still, as above, a radial lug.

Obviously, the present invention is moreover not limited to the embodiments which have been described and represented in the drawings, but rather is covers all variation in its practical realisation and/or in the combination of the various components thereof.

In particular, when the radial lug forming the stop means employed is engaged in a slot of the pressure plate, this slot, instead of being formed on an axial boss of this pressure plate, may be provided on the remaining portion of the edge thereof.

Moreover, and as will have been readily seen, the present invention leaves, in an advantageous fashion, the possibility open of carrying out optional reconditioning of the clutch mechanisms concerned, after these have already been used once.

We claim:

1. A clutch mechanism for a motor vehicle, comprising a generally annular cover; an annular pressure plate; a plurality of resiliently deformable straps each comprising one or more leaf springs and connecting said pressure plate to said cover for rotation therewith; said straps allowing axial displacement of said pressure plate with respect to said cover; fixing means attaching one of the ends of each of said straps to said cover and the other of the ends to said pressure plate; axially acting resilient means bearing against said cover and operable to urge said pressure plate axially away from said cover; and stop means adapted to limit axial travel of said pressure plate to a predetermined distance away from said cover, said stop means including at least one lug fixed to said cover by said fixing means attaching one of said straps to said cover, said lug extending radially inwardly and being engaged in a radially outwardly opening slot provided at the outer periphery of pressure plate, a shoulder limiting said slot axially adjacent said cover for axial abutment with said lug in a storage position of the clutch mechanism.

2. A clutch mechanism according to claim 1, wherein said slot is formed in the outer peripheral edge of the pressure plate.

3. A clutch mechanism according to claim 1, in which said slot extends circumferentially in axial bosses on said pressure plate and opens into intervals between adjacent axial bosses.

4. A clutch mechanism according to claim 1, in which said slot extends axially and opens axially onto the surface of said pressure plate axially remote from said cover.

5. A clutch mechanism according to claim 1, in which said slot extends circumferentially and communicates with an axial groove.

6. A clutch mechanism according to claim 1, in which said radially outwardly opening slot is formed in part by a radial projection for cooperation with said lug.

7. A clutch mechanism for a motor vehicle, comprising a generally annular cover; a generally annular pressure plate; having a plurality of axial bosses, a plurality of resiliently deformable straps connecting the pressure plate to the cover for rotation therewith; said straps allowing axial displacement of said pressure plate with respect to said cover; fixing means attaching one of the ends of each of said straps to said cover and the other of the ends to said pressure plate; axially acting diaphragm spring bearing against said cover and engaging axial bosses on said pressure plate for urging said pressure plate axially away from said cover; and stop means adapted to limit the axial travel of said pressure plate to a predetermined distance away from said cover, said stop means including at least one lug fixed to said cover by said fixing means attaching one of said straps to said cover, said lug extending radially inwardly and engaged in a radially outwardly opening slot provided in one of said axial bosses at the outer peripheral edge of said pressure plate.

8. A clutch mechanism for a motor vehicle, comprising a generally annular cover; a generally annular pressure plate; a plurality of resiliently deformable straps each comprising one or more leaf springs and connecting the pressure plate for the cover for rotation therewith; said straps allowing axial displacement of said pressure plate with respect to said cover; fixing means attaching one of the ends of each of said straps to said cover and the other of the ends to said pressure plate; axially acting resilient means bearing against the cover and to urge said pressure plate axially away from said cover; and stop means adapted to limit the axial travel of the pressure plate at a predetermined distance away from the cover, said stop means comprising at least one lug defined by a radially inward extension of one of said straps adjacent said fixing means attaching said one end of said one strap to said cover, said lug being adapted to cooperate with the pressure plate at the outer peripheral edge for providing axial abutment of said pressure plate in a storage position of said clutch mechanism.

9. A clutch mechanism for a motor vehicle, comprising an annular cover; a generally annular pressure plate; a plurality of resiliently deformable chordal straps each comprising one or more leaf springs and connecting said pressure plate to said cover for rotation therewith; said straps allowing axial displacement of said pressure plate with respect to said cover; fixing means attaching one of the ends of each of said straps to said cover and the other of the ends to said pressure plate; axially acting resilient means bearing against said cover and operable to urge said pressure plate axially away from said cover; and stop means adapted to limit axial travel of said pressure plate a predetermined distance away from said cover said stop means being defined by a chordal edge of one of said straps, said chordal edge of said one strap being cooperable with a corresponding portion of said outer peripheral edge of said pressure plate for providing axial abutment of said pressure plate in a storage position of said clutch mechanism.

10. A clutch mechanism for a motor vehicle, comprising a generally annular cover; a generally annular pressure plate; having axial bosses a plurality of resiliently deformable straps each comprising one or more leaf springs and connecting said pressure plate to said cover for rotation therewith; said straps allowing axial displacement of said pressure plate with respect to said cover each of said straps having an aperture therein, corresponding axial bosses axially extending through each of said apertures, fixing means attaching one of the ends of each of said straps to said cover and the other of the ends to said pressure plate; axially acting diaphragm spring bearing against said cover and said axial bosses for urging said pressure plate axially away from said cover; and stop means adapted to limit axial travel of said pressure plate to a predetermined distance away from said cover, said stop means being defined by zones of said straps surrounding said apertures, said zones being cooperable with corresponding portions on said axial bosses for providing axial abutment of said pressure plate in a storage position of said clutch mechanism.

* * * * *